May 31, 1927.

A. T. HESPE

THERMOMETER

Filed July 16, 1924

1,630,385

INVENTOR
Alfred T. Hespe
BY
Arthur Phelps Marr
ATTORNEY

Patented May 31, 1927.

1,630,385

UNITED STATES PATENT OFFICE.

ALFRED T. HESPE, OF EAST ORANGE, NEW JERSEY.

THERMOMETER.

Application filed July 16, 1924. Serial No. 726,239.

It is well known that considerable difficulty is experienced in "reading" certain types of thermometers and particularly clinical thermometers and other types of thermometers having a mercury column of comparatively small diameter.

One of the chief reasons for the difficulty experienced in discovering the upper or registering surface or edge of the mercury is due to the brilliancy of the mercury and the necessary clearness and resultant brilliancy of the glass.

In the past, many attempts have been made to emphasize the mercury column and my present invention has, for its particular object, means for accomplishing this purpose.

Many attempts have been made to color the mercury, without success. This invention has for another of its objects, a means for giving the mercury the effect of a color and another object of the invention is to lessen the surface reflection or refraction of the glass and to take away from the high reflective brilliancy thereof, so that in appearance, the glass will be less like the reflection from the mercury.

Other objects and the details of construction will be fully set forth as the specification progresses and the accompanying drawing should be referred to for a complete understanding of the specification which follows.

In the drawing:—

Similar reference numerals indicate like parts in all the figures where they appear.

Figure 1:
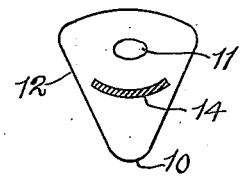
Fig. 1, is an end elevation or sectional view on a large scale, showing one development of my invention.

In the drawing I have shown the well known prismatic type of thermometer, so constructed that the observation portion 10 serves as a magnifying glass, to magnify the mercury which rises and falls in the bore 11 of the thermometer. In each of the figures, the prismatic shaped thermometer glass is indicated in its entirety at 12.

Figure 2:
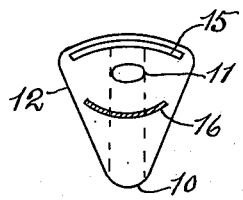
Fig. 2, is a similar view, showing another development of my invention.
Figure 3:
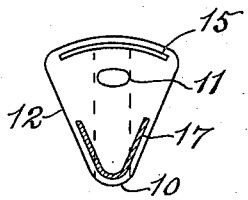
Fig. 3, is a similar view showing a still further development of my invention.

Between the bore 11 and the observation point 10 of the thermometer, I insert a strip of semi-transparent, colored glass as shown at 14 and I may arrange an ordinary light shield 15 behind the bore 11, as shown in Figs. 2 and 3.

In my experiments I have found that if the light shield 15 be formed of semi-opaque, milk-white glass, that it will serve efficiently with my thermometer.

In Fig. 2, the colored strip 16 is shown as of less width or thickness than in Fig. 1; the purpose for which will appear later.

In Fig. 3, the shield 15 is employed, but the colored member, which I insert between the bore 11 and the observation point 10 is V-shaped as shown at 17 and is arranged quite close to the walls of the thermometer glass.

The color of the strips 14, 16 and 17 must be carefully determined. In my experiments, I have employed red or blue and while I prefer that deep colors be used, the amount of color employed must necessarily be regulated, so as not to make the position of the mercury difficult or impossible to discover.

Figure 4:
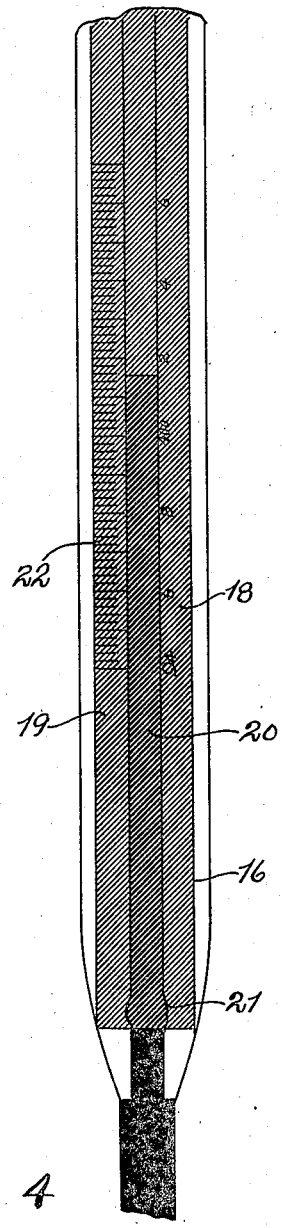
Fig. 4, is a fractured front elevation, showing the appearance of the thermometer and the mercury therein.

The action of the light in relation to a thermometer constructed as here set forth is peculiar to this construction and is best appreciated by reference to Fig. 4.

The light passing through the glass will cause certain portions of the colored strips 14, 16 and 17 to appear in their normal color, or the light passing through the colored strip will weaken the color but that portion of the strip backed up by the mercury will appear very much darker and only to the extent to which the mercury has advanced in the bore.

In Fig. 4, the colored strip 16 has the appearance of being divided into three parts, the parts 18 and 19 being one at each side of the mercury column and the part 20, which appears as a dark streak through the center of the colored member 16, is darkened only to the extent determined by the height of the mercury column.

In Fig. 4, I have shown the strip 16 as terminating at about the bubble 21, which is found in most clinical thermometers. The colored strip may, however, extend downward, terminating at the end of the glass, or at any point below the scale 22.

The position, length and graduations of the scale 22 are determined by the type of thermometer.

If the color of the member 14, 16 and 17 is red, the mercury in the column will appear as though it were colored a deep red.

As previously stated, my invention improves the reading of a thermometer by lessening the stray or refractive lights, always present in thermometer glasses.

As shown in Fig. 1, I have found that the light shield 15 may be omitted. This may be advantageous wherever it is possible to provide a strong light behind the thermometer.

It is well known that certain colors absorb certain parts of other colors and this is particularly true of secondary colors, therefore, it is possible to construct thermometers for different classes of work and thermometers that are particularly adapted for use under varying conditions. Certain shades of red and yellow become invisible when observed through a blue glass and a back strip or light shield of red or yellow, with a blue strip at the observation side of the mercury column would result in almost a total if not a total elimination of the back shield colors and the intensifying of the mercury column to an extent which will make the mercury appear as though colored.

A further purpose of the colored strip in front of the mercury column is to soften the reflected light rays from the back shield.

In producing the glass according to my invention, I take an ordinary blow pipe or pontil and arrange thereon a small piece of suitably colored glass, at one side of, though spaced away from the bore of the pontil. The colored glass and the end of the pontil are then covered with a suitable amount of clear flint glass, which, in turn, is covered on one side with the opaque glass, which is placed on that side of the gather opposite to the colored glass and upon the side which will be opposite to the observation side of the thermometer.

While I have shown a colored strip in front of the mercury column, arranged in but two different positions and in two shapes, its position and shape may be varied and other modifications may be made within the scope of the appended claims, without departing from the principle or sacrificing the advantages of the invention.

Having carefully and fully described my invention, what I claim and desire to obtain is:—

1. A glass tube thermometer having a longitudinal and translucid colored member arranged within the glass and between the mercury column and the observation side of the thermometer, said colored member being of a color contrasting with that of the body of the thermometer.

2. A glass tube thermometer having a translucid colored strip within the glass and between the mercury column and the observation side of the thermometer and extending the full length of the scale.

3. A glass tube thermometer having a colored member within the thermometer glass and directly in front of the mercury column and a contrastingly colored member within the glass and behind the mercury column, said colored members being approximately parallel and of approximately equal length.

4. Means for improving the reading of glass tube thermometers, which consists of a translucid colored member within the glass and directly in front of the mercury column and a second colored member within the glass and behind the mercury column, both said colored members being of a length equal to the length of the scale of the thermometer.

Signed at the city, county and State of New York, this 3rd day of July, 1924.

ALFRED T. HESPE.